United States Patent
Jeon et al.

(10) Patent No.: US 9,876,657 B1
(45) Date of Patent: Jan. 23, 2018

(54) SYSTEM AND METHOD FOR DOWNLINK PROCESSING IN COMMUNICATION SYSTEMS

(71) Applicant: Xilinx, Inc., San Jose, CA (US)

(72) Inventors: Charles Jeon, Ithaca, NY (US);
Christoph E. Studer, Ithaca, NY (US);
Michael Wu, Palo Alto, CA (US);
Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/451,209

(22) Filed: Mar. 6, 2017

(51) Int. Cl.
*H04K 1/02* (2006.01)
*H04L 25/03* (2006.01)
*H04L 25/49* (2006.01)
*H04B 7/0452* (2017.01)

(52) U.S. Cl.
CPC ..... *H04L 25/03159* (2013.01); *H04B 7/0452* (2013.01); *H04L 25/03012* (2013.01); *H04L 2025/03426* (2013.01)

(58) Field of Classification Search
CPC .............. H03F 1/3247; H03F 1/3294; H03F 2201/3233; H03F 3/24; H03F 1/3241; H04L 27/368; H04L 25/03343; H03G 3/3042
USPC .................................................. 375/295–297
See application file for complete search history.

(56) References Cited

U.S. PATENT DOCUMENTS

| | | | | |
|---|---|---|---|---|
| 6,246,286 B1 * | 6/2001 | Persson | ................ | H03F 1/3241 330/136 |
| 6,697,436 B1 * | 2/2004 | Wright | ............... | G01N 27/4163 330/106 |
| 6,836,517 B2 * | 12/2004 | Nagatani | ............... | H03F 1/3247 375/296 |
| 6,907,085 B2 * | 6/2005 | Kubo | .................... | H03F 1/3247 332/124 |

(Continued)

OTHER PUBLICATIONS

Eckstein, J., et al., "On the Douglas-Rachford splitting method and the proximal poin t algorithm for maximal monotone operators," Mathematical Programming, vol. SS , pp. 293-318, 1992.

(Continued)

*Primary Examiner* — James M Perez
(74) *Attorney, Agent, or Firm* — David O'Brien; Hong Shi (57) ABSTRACT

An integrated circuit (IC) includes a downlink unit including an input to receive a first plurality of frequency domain (FD) symbols associated with data symbols for a plurality of users, and an iteration unit to perform a plurality of iterations based on adjustment values. Each iteration includes generating a second plurality of FD symbols by performing a precoding process based on the first plurality of FD symbols, generating a third plurality of time domain (TD) symbols by performing a first modulation process based on the second plurality of FD symbols, generating a fourth plurality of TD symbols by performing a dynamic range reduction process based on absolute values of the third plurality of TD symbols, and updating the adjustment values. The downlink unit further includes a decision unit configured to generate transmit TD symbols for transmission through a channel to the plurality of users.

20 Claims, 8 Drawing Sheets

(56) References Cited

U.S. PATENT DOCUMENTS

| | | | | |
|---|---|---|---|---|
| 6,920,127 B2* | 7/2005 | Ozluturk | ............... | H03G 11/04 370/342 |
| 7,288,988 B2* | 10/2007 | Braithwaite | .......... | H03F 1/3247 330/136 |
| 7,324,437 B1* | 1/2008 | Czylwik | ................... | H04L 1/06 370/203 |
| 7,583,725 B1* | 9/2009 | Dick | ..................... | H04L 1/0033 375/219 |
| 8,040,182 B2* | 10/2011 | Horiguchi | ................ | H03F 1/30 330/149 |
| 8,831,136 B2* | 9/2014 | Ishikawa | ................ | H04B 15/00 375/295 |
| 9,455,760 B1* | 9/2016 | Dick | ..................... | H03F 1/3247 |
| 9,686,054 B2* | 6/2017 | Yang | ..................... | H04L 5/0005 |
| 2004/0131007 A1* | 7/2004 | Smee | ..................... | H04B 7/0669 370/208 |
| 2005/0157814 A1* | 7/2005 | Cova | ..................... | H03F 1/3247 375/297 |
| 2005/0195914 A1* | 9/2005 | Kim | ..................... | H04L 1/0618 375/267 |
| 2006/0025080 A1* | 2/2006 | Sutskover | ........... | H04W 52/325 455/69 |
| 2006/0188038 A1* | 8/2006 | Shako | ................... | H03F 1/3247 375/296 |
| 2006/0240786 A1* | 10/2006 | Liu | ....................... | H03F 1/3247 455/114.3 |
| 2007/0004465 A1* | 1/2007 | Papasakellariou | .. | H04W 52/282 455/571 |
| 2008/0144749 A1* | 6/2008 | Wilhelmsson | .... | H04L 25/03248 375/346 |
| 2010/0052780 A1* | 3/2010 | Summerfield | ........ | H03F 1/3247 330/149 |
| 2013/0022097 A1* | 1/2013 | Hewavithana | ........ | H04L 25/022 375/232 |
| 2014/0133527 A1* | 5/2014 | Dick | .................... | H03F 1/3247 375/219 |
| 2015/0049792 A1* | 2/2015 | Han | .................. | H04L 25/03012 375/219 |

OTHER PUBLICATIONS

Studer C., et al., PAR-Aware Large-Scale Multi-User MIMO-OFDM Downlink, IEEE Journal on Selected Areas in Communications, vol. 31, No. 2, Feb. 2013, pp. 303-313.

* cited by examiner

Algorithm 400

Input:  ε, P, K, $s_w$, $H_w$
Output: $X, X', \hat{B}$

1:   initialize $Z^{(0)} = \mathbf{0}_{N \times W}$
2:   for k = 1, ..., K, do
3:      for $w \in \Omega_{occupied}$, do
4:         $\alpha(z_w^{(k-1)}) = \max\left\{0, 1 - \varepsilon \|s_w - H_w z_w^{(k-1)}\|_2^{-1}\right\}$
5:         $x_w^{(k)} = z_w - \alpha(z_w^{(k-1)}) H_w^H (H_w H_w^H)^{-1}(H_w z_w^{(k-1)} - s_w)$
6:      end
7:      for $w \in \Omega_{occupied}^c$, do
8:         $x_w^{(k)} = \mathbf{0}_{N \times 1}$
9:      end
10:    $B^{(k)} = F^H(2X^{(k)} - Z^{(k-1)})^T$
11:    $\hat{B}^{(k)} = trunc(B^{(k)}; P)$
12:    $X'^{(k)} = (F\hat{B}^{(k)})^T$
13:    $Z^{(k)} = Z^{(k-1)} + X'^{(k)} - X^{(k)}$
14:   end
15:   return $X, X',$ or $\hat{B}$ Lines 3–9: $C_1$
Lines 10–13: $C_2$

SYSTEM AND METHOD FOR DOWNLINK PROCESSING IN COMMUNICATION SYSTEMS

FIELD

Examples of the present disclosure generally relate to integrated circuits (ICs) and, in particular, to an embodiment related to multi-user (MU) multiple-input, multiple-output (MIMO) system.

BACKGROUND

Multi-user multiple-input multiple-output (MU-MIMO) is a promising technology to meet the growing demands for higher throughput and improved spectral efficiency, coverage, and range. In MU-MIMO systems, a base station may serve a large number of users concurrently in the same frequency band. Such MU-MIMO systems may experience inter-symbol-interference (ISI) caused by a frequency-selective fading channel and multi-user interference (MUI) caused by simultaneous multi-user communication in the same frequency band. Furthermore, the transmitted time-domain signals in the MU-MIMO systems may exhibit a large dynamic range, which may lead to out-of-band (OOB) distortions caused by signal saturation and clipping.

Accordingly, it would be desirable and useful to provide an improved transmission scheme for the MU-MIMO systems.

SUMMARY

In some embodiments in accordance with the present disclosure, an integrated circuit (IC) includes a downlink unit. The downlink unit includes an input configured to receive a first plurality of frequency domain (FD) symbols associated with data symbols for a plurality of users; and an iteration unit configured to receive the first plurality of FD symbols and perform a plurality of iterations based on adjustment values. The performing each iteration includes generating a second plurality of FD symbols by performing a precoding process based on the first plurality of FD symbols and the adjustment values; generating a third plurality of time domain (TD) symbols by performing a first modulation process based on the second plurality of FD symbols and the adjustment values; generating a fourth plurality of TD symbols by performing a dynamic range reduction process to the third plurality of TD symbols based on absolute values of the third plurality of TD symbols; and updating the adjustment values based on the first plurality of FD symbols and the fourth plurality of TD symbols. The downlink unit further includes a decision unit configured to generate transmit TD symbols for transmission through a channel to the plurality of users based on one of the second plurality of FD symbols and the fourth plurality of TD symbols.

In some embodiments, the updating the adjustment values includes generating a fifth plurality of FD symbols by performing a second modulation process based on the fourth plurality of TD symbols; and updating the adjustment values based on differences between corresponding FD symbols of the second plurality of FD symbols and the fifth plurality of FD symbols.

In some embodiments, the precoding process includes for each non-occupied subcarrier of the channel, generating corresponding FD symbols of the second plurality of FD symbols with a value of zero; and for each occupied subcarrier of the channel, generating corresponding FD symbols of the second plurality of FD symbols based on FD symbols of the first plurality of FD symbols assigned to the occupied subcarrier and a multi-user interference (MUI) constraint parameter.

In some embodiments, the dynamic range reduction process includes determining that a first TD symbol of the third plurality of TD symbols has a first absolute value greater than a dynamic range constraint parameter; and generating a corresponding second TD symbol of the fourth plurality of TD symbols with a second absolute value less than the first absolute value.

In some embodiments, the IC includes a plurality of transmit antennas configured to transmit the transmit TD symbols simultaneously over the channel.

In some embodiments, the dynamic range constraint parameter is configured based on at least one of a first number of the plurality of transmit antennas, a second number of the plurality of users, and a channel matrix of the channel.

In some embodiments, the first TD symbol of the third plurality of TD symbols and the corresponding second TD symbol of the fourth plurality of TD symbols have a same phase.

In some embodiments, the decision unit is configured to determining that an MUI constraint of the transmission has a higher priority than a dynamic range constraint of the transmission; and generating the transmit TD symbols by performing a second modulation process based on the second plurality of FD symbols.

In some embodiments, the decision unit is configured to determining that an MUI constraint of the transmission has a lower priority than a dynamic range constraint of the transmission; and generating the transmit TD symbols based on the fourth plurality of TD symbols.

In some embodiments, the iteration unit includes a first sub-precoding unit configured to perform the precoding process to a first group of the first plurality of FD symbols assigned to a first group of subcarriers of the channel; and a second sub-precoding unit configured to, in parallel with the first sub-precoding unit, perform the precoding process to a second group of the first plurality of FD symbols assigned to a second group of subcarriers of the channel.

In some embodiments in accordance with the present disclosure, a method includes receiving a first plurality of frequency domain (FD) symbols associated with data symbols for a plurality of users; and performing a plurality of iterations based on adjustment values. The performing each iteration includes generating a second plurality of FD symbols by performing a precoding process based on the first plurality of FD symbols and the adjustment values; generating a third plurality of time domain (TD) symbols by performing a first modulation process to the second plurality of FD symbols based on the adjustment values; generating a fourth plurality of TD symbols by performing a dynamic range reduction process to the third plurality of TD symbols based on absolute values of the third plurality of TD symbols; and updating the adjustment values based on the first plurality of FD symbols and the fourth plurality of TD symbols. The method further includes generating transmit TD symbols for transmission through a channel to the plurality of users based on one of the second plurality of FD symbols and the fourth plurality of TD symbols.

In some embodiments, the method includes transmitting, using a plurality of transmit antennas, the transmit TD symbols simultaneously over the channel.

In some embodiments, the generating the second plurality of FD symbols includes performing a first sub-precoding process to a first group of the first plurality of FD symbols assigned to a first group of subcarriers of the channel; and performing a second sub-precoding process, in parallel with the first sub-precoding process, to a second group of the first plurality of FD symbols assigned to a second group of subcarriers of the channel.

Other aspects and features will be evident from reading the following detailed description and accompanying drawings.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. Large-scale or massive MU-MIMO systems use a large number of antenna units having orders of magnitude more elements at the base station compared to small-scale MIMO systems, while serving multiple users simultaneously and in the same frequency band. While orthogonal frequency-division multiplexing (OFDM) may be used to reduce the computational complexity of ISI removal, the transmitted time-domain signals in such MU-MIMO systems using OFDM may exhibit a large dynamic range. This may lead to out-of-band (OOB) distortions caused by signal saturation and clipping. To mitigate such OOB distortions, the MU-MIMO systems may require the use of linear radio-frequency (RF) circuitry, which may be power inefficient. As such, deploying OFDM in a large-scale MU-MIMO system can be challenging on error-rate performance, computational complexity, linearity requirements, and power consumption. For integrated circuit (IC) solutions, it has been discovered that a downlink unit may be exploited to jointly perform precoding to remove multi-user interference, modulation, and dynamic range reduction in the downlink, which enables designs with low computational complexity and improves IC performance in computation bandwidth or speed and power consumption.

With the above general understanding borne in mind, various embodiments for MU-MIMO downlink operations are generally described below. In the discussion below, boldface lowercase letters denote column vectors, and boldface upper case letters denote matrices. For a matrix A, its $j^{th}$ column is denoted as $a_j$. The transpose, the Hermitian transpose, and the largest singular value of a matrix A is denoted as $A^T$, $A^H$, and $\sigma_{max}(A)$. The N×N identity matrix is denoted as $I_N$. The N×N normalized discrete Fourier transform (DFT) matrix is denoted as $F_N$. The N×N normalized inverse DFT matrix is denoted as $F_N^H$, where $F_N F_N^H = I_N$. For simplicity only, $F_N$ may be denoted as F. For a column vector a, the $i^{th}$ element of a is denoted by $a_i$. A vector that consists of element-wise reciprocals of a is denoted as $1/a$. The Euclidean norm ($l_2$ norm) of a vector a is denoted by $\|a\|_2$. The $l_\infty$ norm of a vector a is denoted by $\|a\|\infty$. A complement of a set $\Omega$ is denoted as $\Omega^c$.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
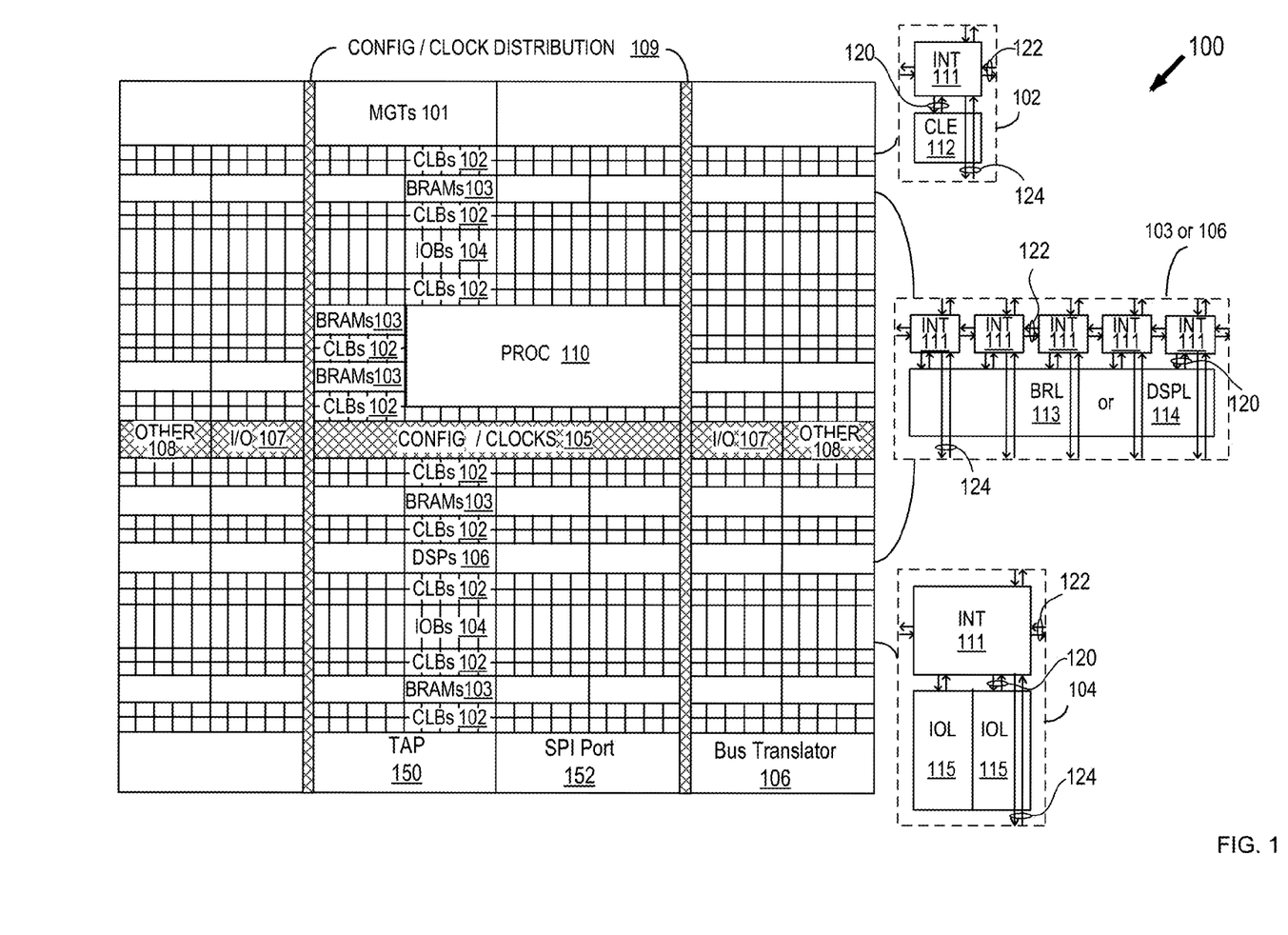
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the downlink data processing is not limited to the exemplary IC depicted in FIG. 1, and that IC having other configurations, or other types of IC, may also implement the downlink data processing.

Figure 2:
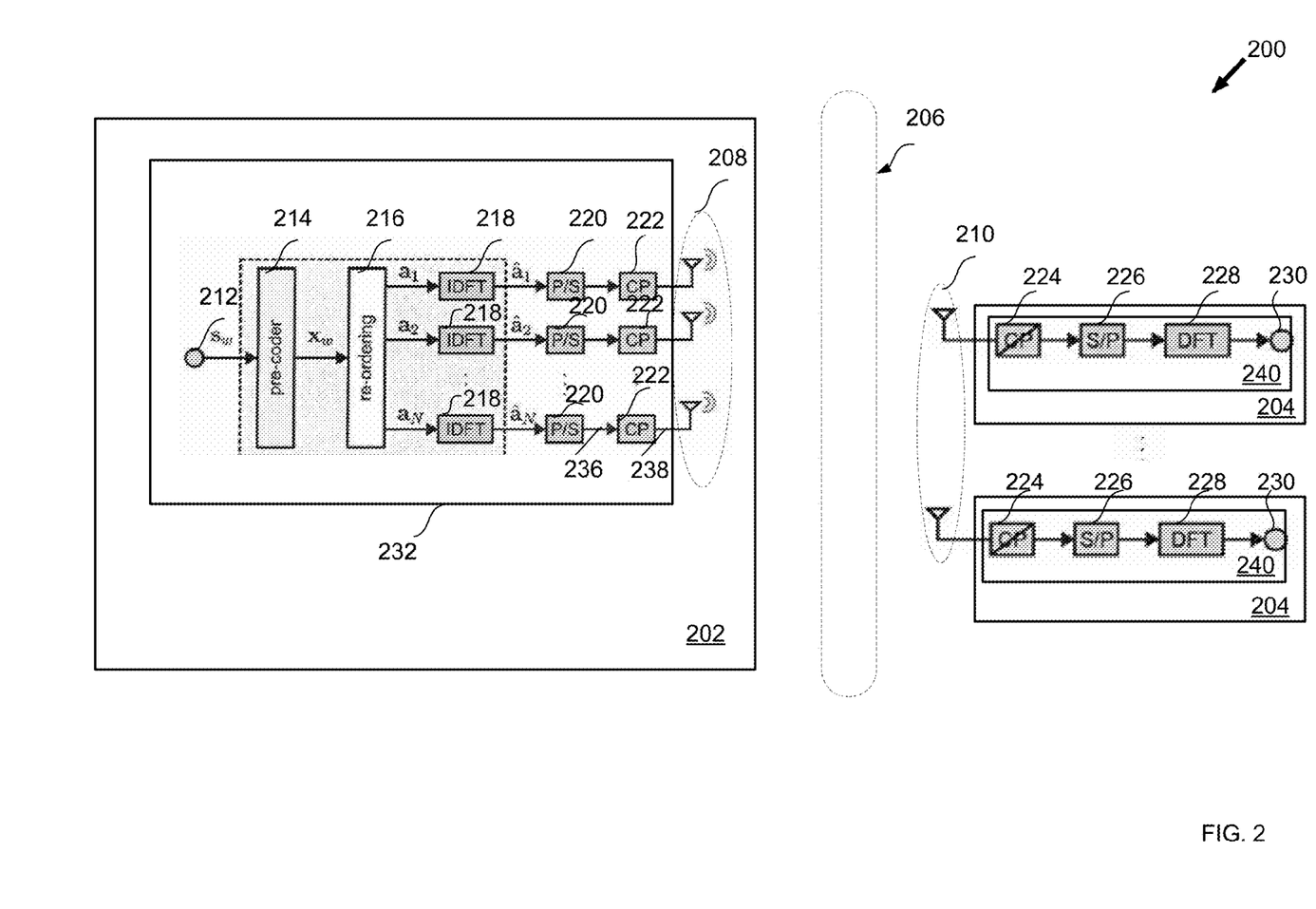
FIG. 2 is a block diagram illustrating an exemplary communication system according to some embodiments of the present disclosure.

Referring to FIG. 2, illustrated is an exemplary communication system 200. Communication system 200 includes a base station 202 and users 204 (also referred to as user devices or user equipment (UE) units 204). More than one user 204 may be coupled to base station 202 at a time. Users 204 may be coupled to base station 202 via over-the-air ("wireless") communication channel 206.

Communication system 200 is for bidirectional communication, namely a downlink for sending information from base station 202 to users 204, and an uplink for sending information from users 204 to base station 202. Base station 202 may include a downlink unit 232 to perform a downlink process and an uplink unit to perform an uplink process. In some embodiments, communication system 200 may be an MU-MIMO system with N base station antennas (e.g., N transmit antennas 208 for a downlink) at base station 202 communicating with U user antennas 210 of users 204 in the downlink, where N and U are positive integers greater than 1. Each user 204 may have a single user antenna or multiple user antennas 210 coupled to the base station 202. An example of the base station 202 concurrently serving U single antenna users may be applied straightforwardly to the base station 202 concurrently serving users 204 each having multiple antennas. Thus, even though the user antenna number U as described below may generally refer to U user antennas from U single antenna users, the user antenna number U may be considered to include a number of antennas of single and/or multiple antenna users being serviced by a base station 202.

In the illustrated example of FIG. 2, OFDM is used to reduce the computational complexity of ISI removal. As shown in FIG. 2, in an OFDM downlink system, input symbols are processed in the frequency-domain (FD) to provide an FD vector $s_w$ at an input 212 for each $w^{th}$ subcarrier. The FD vector $s_w$ intended to be sent to all the U users for the $w^{th}$ subcarrier may be modeled as:

$$s_w = [s_w^{(1)}, \ldots, s_w^{(U)}]^T.$$

where subcarrier index $w = 1, \ldots, W$, and W is the total number of subcarriers.

In some embodiments, after data for all the users are received, the downlink unit 232 may perform a precoding process to $s_w$ to generate an FD signal $x_w$. In an example, a precoder 214 may perform a precoding process to $s_w$ based on a downlink channel matrix $H_w$ on a per-subcarrier basis. The FD signal $x_w$ may be modeled as:

$$x_w = [x_w^{(1)}, \ldots, x_w^{(N)}]^T.$$

A reordering unit 216 of the downlink unit 232 may collect $x_w$ for all subcarriers, and reorder the vectors $x_w$ according to the following mapping:

$$[x_1, x_2, \ldots, x_W] = [a_1, a_2, \ldots, a_n, \ldots, a_N]^T.$$

The W-dimensional vector a corresponds to the frequency domain signal to be transmitted from the $n^{th}$ transmit antenna 208 of the base station 202.

In some embodiments, inverse Fourier transform units 218 of the downlink unit 232 may apply inverse Fourier transform (e.g., inverse digital Fourier transform (IDFT)) to the W-dimensional vectors $a_n$ of the matrix A respectively to generate time domain (TD) vectors $\hat{a}_n$ as follows:

$$\hat{a}_n = F^H a_n.$$

A parallel-to-serial conversion unit 220 of the downlink unit may then perform a parallel-to-serial conversion to the TD vector $\hat{a}_n$ to generate a serial signal 236. The serial signal 236 may be sent to a cyclic prefix unit 222 that adds a cyclic prefix to the serial signal 236 to remove ISI. The resulting signal 238 may then be transmitted by the $n^{th}$ transmit antenna 208. In some examples, the resulting signals 238 are transmitted from the N transmit antennas 208 simultaneously over the communication channel 206 (e.g., a frequency selective channel) to the users 204.

In the example of FIG. 2, user antennas 210 may receive TD signals transmitted over the communication channel 206. A receiver 240 of a user 204 may include a cyclic prefix removal unit 224 to remove the added cyclic prefix from the received TD signal. A serial-to-parallel conversion unit 226 may receive the resulting signal from the cyclic prefix removal unit 224 and generate a signal including parallel data. Fourier transform units 228 of the receiver 240 may apply Fourier transform (e.g., digital Fourier transform (DFT)) to the signal provided by the serial-to-parallel conversion unit 226 to generate received FD symbols $y_w$ (also referred to as receive vector). FD symbols $y_w$ may be provided at outputs 230 of the receivers 240 of the users 204.

In some embodiments, the FD input-output relationship on the $w^{th}$ subcarrier is modeled as:

$$y_w = H_w x_w + n_w,$$

where $y_w = [y_w^{(1)}, \ldots, y_w^{(U)}]^T$, $x_w = [x_w^{(1)}, \ldots, x_w^{(N)}]^T$, $n_w = [n_w^{(1)}, \ldots, n_w^{(U)}]^T$, and $$H_w = \begin{bmatrix} h_w^{(1,1)} & \cdots & h_w^{(1,N)} \\ \vdots & \ddots & \vdots \\ h_w^{(U,1)} & \cdots & h_w^{(U,N)} \end{bmatrix}.$$

Here, $y_w^{(i)}$ is the FD symbol received on the subcarrier w for the i-th user antenna 210. $H_w$ is a channel matrix where $h_w^{(i,j)}$ is the frequency gain/attenuation on the $w^{th}$ subcarrier between the i-th user antenna 210 and j-th transmit antenna 208. The $x_w^{(i)}$ denotes the precoded symbol at the base station 202 that is transmitted on the j-th transmit antenna 208 on the subcarrier w, and the scalar $n_w^{(i)}$ represents user noise at the i-th user antenna 210 in the frequency domain (e.g., i.i.d. circularly symmetric complex zero-mean Gaussian noise with variance $N_0$).

It is noted that the intended signal for the users is given by $s_w$, while the base station 202 performs the precoding process on $s_w$ to generate $x_w$ that is transmitted over the communication channel 206. Also note th in a massive MU-MIMO downlink system, the number N of base station antennas may greatly outnumber the number U of users (e.g., N>>U).

In various embodiments, in large-scale MU-MIMO systems, the base station 202 may broadcast data to serve all the users 204 simultaneously, which may greatly increase the spectral efficiency. However, in such embodiments, the base station 202 of the large-scale MU-MIMO system need to consider two sources of interference including ISI due to the frequency selective channel and multi-user interference due to simultaneous multi-user communication on the same frequency. While the use of OFDM and the cyclic prefix technique as discussed above with reference to the MU-MIMO system 200 of FIG. 2 may remove ISI, the base station 202 may still need to compensate the multi-user interference during the downlink.

In some embodiments, to suppress multi-user interference, the downlink unit 232 of the base station 202 may precode $s_w$ to generate transmit symbols $x_w$. While a linear zero-forcing (ZF) precoder may completely remove the multi-user interference, such a linear ZF precoder may produce signals that have a high dynamic range. Transmitting high dynamic range signals require high-precision radio frequency circuitry including inefficient linear power amplifiers, which results in prohibitive cost for large-scale MU-MIMO systems. In some embodiments, a modulation process and a dynamic range reduction process may follow the precoding process and reduce the dynamic range of the signals by using various peak-to-average power ratio (PAPR) reduction techniques (e.g., an amplitude clipping and filtering technique, a companding technique). However, such a modulation process and a dynamic range reduction process may increase the multi-user interference in the signals, and limit the spectral efficiency.

Figure 3:
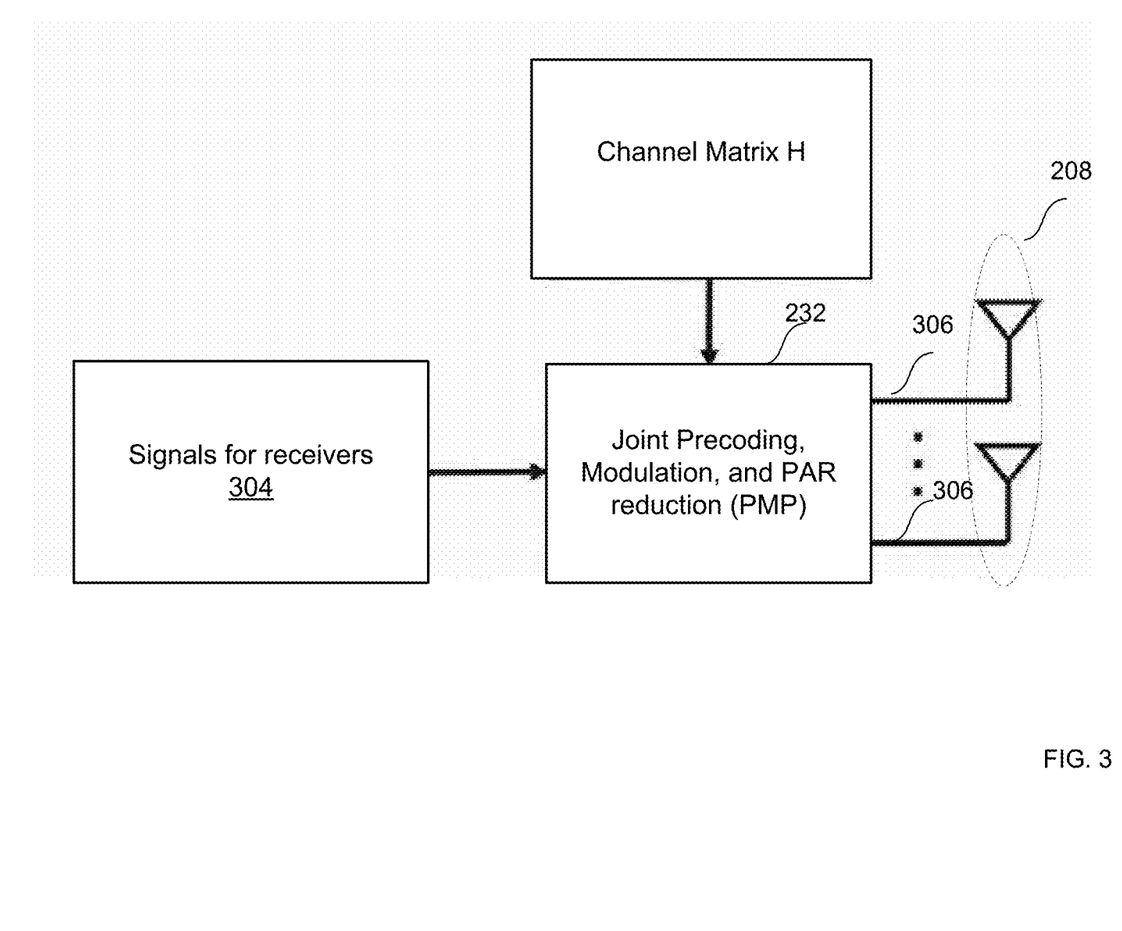
FIG. 3 is a block diagram illustrating an exemplary downlink system according to some embodiments of the present disclosure.

Referring to FIGS. 3, 4, 5, 6, and 7, in some embodiments, a downlink unit may generate transmit signals that have both low multi-user interference and low dynamic range by jointly performing precoding, modulation, and dynamic range reduction (PMD). Illustrated in FIG. 3 is a downlink unit 232 of the base station 202, which receives signals intended for receivers 304 and a channel matrix H, and generates signals 306 to be transmitted by the transmit antennas 208. As discussed in detail below, to achieve low computational complexity, a DR splitting method is used to solve an optimization problem associated with jointly performing precoding, modulation, and dynamic range reduction in the downlink unit 232.

In some embodiments, the PMD problem to be solved in the downlink unit 232 by jointly performing precoding, modulation, and dynamic range reduction may be provided as follows:

find $$x_w, w=1,\ldots,W$$

subject to $$\|s_w - H_w x_w\|_2 \le \epsilon, w \in \Omega_{occupied}; \quad (1)$$

$$x_w = 0_{N \times 1}, w \in \Omega^c_{occupied}; \quad (2)$$

$$\|t_n\|_\infty \le P, n=1,\ldots,N, \text{ and } T = F^H X^T \quad (3)$$

The goal of the PMD problem is to find frequency domain transmit signal $x_w$ that satisfies a precoding constraint provided by equation (1), a guard-tone constraint provided by equation (2), and a dynamic range constraint provided by equation (3). The precoding constraint provided by equation (1) may be used to remove the MUI, and is also referred to as the multi-user interference constraint. The precoding constraint parameter $\epsilon$ is used to control the accuracy of the precoding constraint, and is also referred to as the MUI constraint parameter E. In some embodiments, the precoding constraint parameter $\epsilon$ is equal to or greater than zero. In an example where the precoding constraint parameter $\epsilon$ has a value of zero, the precoding constraint is perfectly satisfied.

In some embodiments, the guard tone constraint provided by equation (2) is used to ensure that there are no precoding signals to be transmitted in the unoccupied data carriers.

In some embodiments, in the dynamic range constraint provided by equation (3), F denotes a discrete Fourier transform matrix, and T denotes the time domain transmit signals. The dynamic range parameter P may be used to control the peak amplitude of the time domain transmit signals T, and may also be referred to as the peak amplitude parameter P. In some embodiments, the dynamic range parameter P may have a value between zero and one (e.g., between zero and 0.4). The dynamic range parameter P may be determined based on the number N of transmit antennas 208, the number U of the users 204, and/or the channel conditions of the communication channel 206 (e.g., the channel matrix H). In an example where the base station 202 includes one hundred transmit antennas 208, the dynamic range parameter P may have a value of 0.01.

In a large-scale MU-MIMO downlink system where N>>U, there may be an infinite number of possible precoded signals that satisfy the precoding constraint. As such, the goal of the problem is to find time domain transmit signals corresponding to the precoded signals that also satisfy the dynamic range constraint, where the corresponding frequency domain transmit signals of those time domain transmit signals also satisfy the precoding and guard-tone constraints.

In some embodiments, the DR splitting method may be used to find a solution to the PMD problem. To use the DR splitting method, the PMD problem is formulated in the following form:

$$\underset{x}{\text{minimize}} \; f(X) + g(X).$$

Here each of $f(X)$ and $g(X)$ is a convex function.

In some embodiments, $f(X)$ is set to be:

$$f(X) = \chi(X \in C_1),$$

where the set $C_1$ is provided as follows:

$$C_1 = \{X = [x_1, \ldots, x_W] : \|s_w - H_w x_w\|_2 \leq \epsilon, w \in \Omega_{occupied} \text{ and } x_w = 0_{N \times 1}, w \in \Omega_{occupied}^c\}.$$

In some embodiments, $g(X)$ is set to be:

$$g(X) = \chi(X \in C_2),$$

Where the set $C_2$ is provided as follows:

$$C_2 = \{X = [x_1, \ldots, x_W] : \|t_n\|_\infty \leq P, n = 1, \ldots, N, \text{ and } T = F^H X^T\}.$$

Here $\chi(X \in C)$ is a characteristic function, which has a value of zero if the condition $X \in C$ is satisfied, and has a value of infinity if the condition $X \in C$ is not satisfied. In an example where a set C is convex, the characteristic function $\chi(X \in C)$ is a convex function, although it may be a non-smooth function.

Because both sets $C_1$ and $C_2$ are convex, DR splitting may be applied to solve the PMD problem using the following algorithm:

Initialize $Z^{(0)} = 0_{N \times W}$;
for k=1:K, do $$X^{(k)} = \text{prox}_f(Z^{(k-1)}; \tau);$$

$$X'^{(k)} = \text{prox}_g(2X^{(k)} - Z^{(k-1)}; \tau);$$

$$Z^{(k)} = Z^{(k-1)} + X'^{(k-1)} - X^{(k)}$$

end where K is an integer indicating the number of iterations, and $\tau$ is a convergence parameter that may be used to tune the convergence rate of the algorithm.

For the function $f(X)$, a proximal operator may be defined as follows:

$$\text{prox}_f(Z, \tau) = \arg\min_X \tau f(X) + \frac{1}{2}\|X - Z\|^2.$$

Similarly, for the function $g(X)$, the proximal operator may be defined as follows:

$$\text{prox}_g(Z, \tau) = \arg\min_X \tau g(X) + \frac{1}{2}\|X - Z\|^2.$$

Such proximal operations for the characteristic functions $f(X) = \chi(X \in C_1)$ and $g(X) = \chi(X \in C_2)$ may be computed efficiently. For the precoding constraint and the guard-tone constraint of the PMD problem, X satisfying the characteristic function $f(X)$ may be computed according to the proximal operator for the function $f(X)$ as follows:

$$\alpha(z_w^{(k-1)}) = \max\{0, 1 - \epsilon \|s_w - H_w z_w^{(k-1)}\|_2^{-1}\|_2^{-1}\},$$
$$w \in \Omega_{occupied};$$

$$x_w^{(k)} = z_w - \alpha(z_w^{(k-1)}) H_w^H (H_w H_w^H)^{-1}(H_w z_w^{(k-1)} - s_w),$$
$$w \in \Omega_{occupied};$$

$$x_w^{(k)} = 0_{N \times 1}, w \in \Omega_{occupied}^c.$$

In some embodiments, the computation of $x_w^{(k)}$, $w \in \Omega_{occupied}$ may be referred to as a precoding process, where orthogonal projection is computed for each subcarrier w with respect to the precoding constraint provided by equation (1). As such, the precoding process to compute $x_w^{(k)}, w \in \Omega_{occupied}$ may also be referred to as a projecting process.

For the dynamic range constraint of the PMP problem, X' satisfying the characteristic function $g(X)$ may be computed according to the proximal operator for the function $g(X)$ as follows:

$$B^{(k)} = F^H(2X^{(k)} - Z^{(k-1)})^T;$$

$$\hat{B}^{(k)} = \text{trunc}(B^{(k)}; P);$$

$$X'^{(k)} = (F\hat{B}^{(k)})^T;$$

In some embodiments, the computation of $B^{(k)}$ may be referred to as a modulation process performed to generate TD symbols B based on FD symbols X and adjustment values Z.

In some embodiments, the computation of $\hat{B}^{(k)}$ may be referred to as a dynamic range reduction process. In an example, the trunc $(B^{(k)}; P)$ operation may be performed using one of the following formulas:

$$\hat{b}^{(k)} = \begin{cases} -P, & \text{if } b^k < -P \\ b^k, & \text{if } |b^k| \leq P \\ P, & \text{if } b^k > P \end{cases} \quad (4)$$

$$\hat{b}^{(k)} = \begin{cases} b^k, & \text{if } |b^k| \leq P \\ P e^{j\phi(b^k)}, & \text{if } |b^k| > P \end{cases} \quad (5)$$

where $\varphi(b^k)$ is the phase of the value $b^k$. Note that equation (4) may be applied to real-valued signals, while equation (5) may be applied to both complex-valued signals and real-valued signals.

Figure 4:
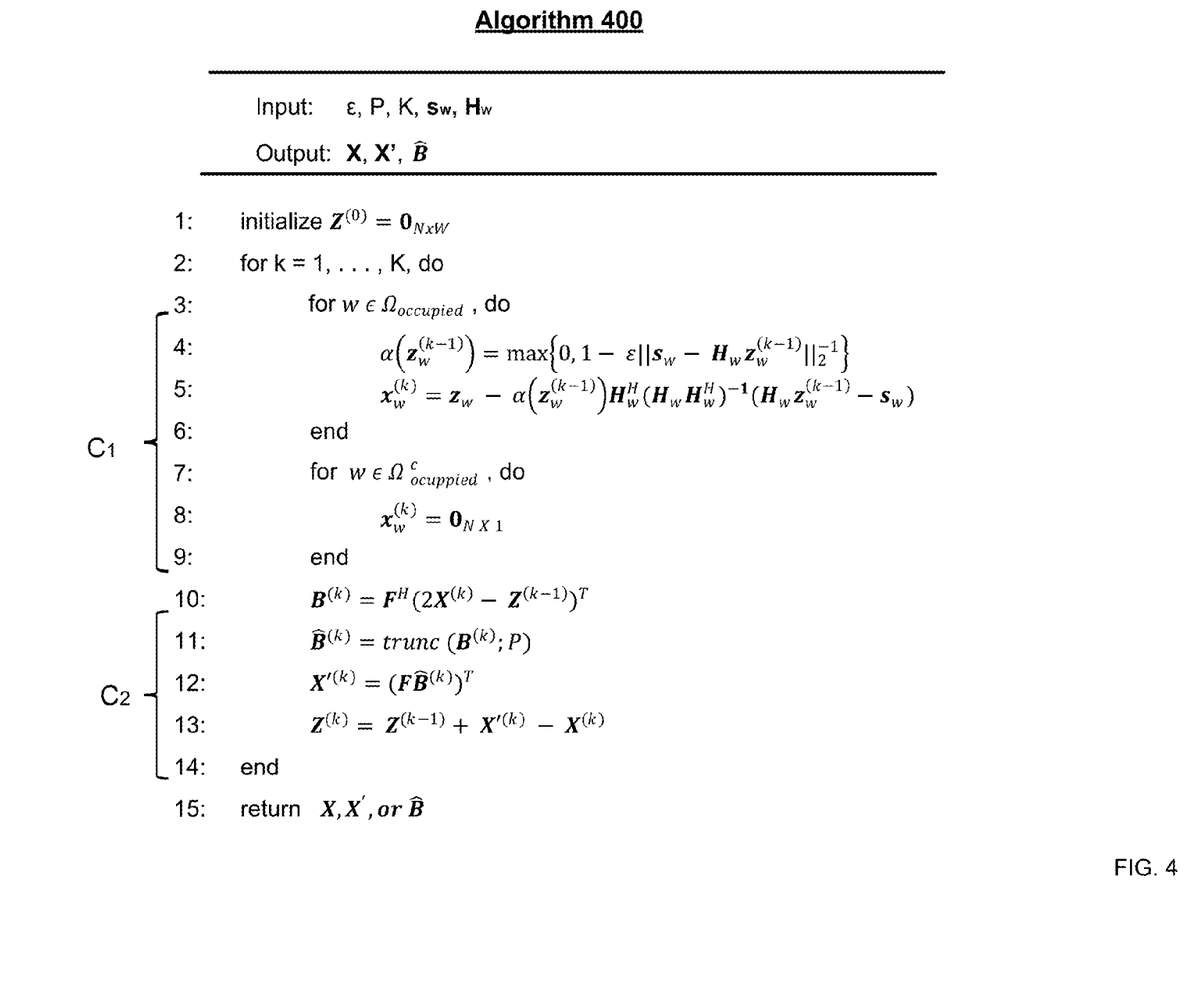
FIG. 4 is a pseudo code for a downlink operation according to some embodiments of the present disclosure.

Referring to FIG. 4, illustrated is a pseudo code for an algorithm 400 to perform downlink process using DR splitting to solve the PMD problem as discussed above according to some embodiments. As illustrated in FIG. 4, the process of the algorithm 400 may receive inputs including a precoding constraint parameter $\epsilon$, a dynamic range parameter P, symbol vector $s_w$ and channel matrix $H_w$ for each subcarrier w. The process of the algorithm 400 may also receive an integer K indicating the number of iterations to be performed. The process of algorithm 400 may provide outputs including a frequency domain matrix X, a frequency domain matrix X' and/or a truncated time domain matrix $\hat{B}$ corresponding to the frequency domain matrix X'.

In some embodiments, the algorithm 400 initializes adjustment values Z, which corresponds to line 1 of the algorithm 400. The adjustment values Z may be a matrix including N rows and W columns, and each element of the adjustment values Z is initialized to be zero.

The algorithm 400 may then perform K iterations, which corresponds to lines 2 to 13 of the algorithm 400. During each iteration, a precoding process, a modulation process, and a dynamic range reduction process are performed. Lines 3 to 9 of the algorithm 400 correspond to computing a frequency domain matrix X according to the characteristic function $f(X)$. Specifically, lines 3 to 6 of the algorithm 400 correspond to the precoding constraint provided by equation (1), where a precoding process is performed. For each occupied subcarrier w, the precoding process is performed by computing a precoded vector $x_w$ using the channel matrix $H_w$, the adjustment value vector $z_w$, and the precoding constraint parameter $\epsilon$. Lines 7 to 9 of the algorithm 400 correspond to the guard-tone constraint provided by equation (2), where for each unoccupied subcarrier w, each element of the corresponding precoded vector $x_w$ is set to zero. The resulting frequency domain matrix X includes the precoded vector $x_w$, w=1, ..., W, and satisfies both the precoding constraint and the guard-tone constraint.

As illustrated in FIG. 4, lines 10 to 14 of the algorithm 400 correspond to computing a frequency domain matrix X' according to the characteristic function g(X). Corresponding to line 10 of the algorithm 400, a modulation process is performed generate a time domain matrix B based on the frequency domain matrix X and the adjustment values Z using an inverse digital Fourier transform matrix $F^H$. In some examples, a fast Fourier transform process may be utilized to accelerate the modulation process. Corresponding to line 11 of the algorithm 400, a dynamic range reduction process is performed to generate a truncated time domain matrix $\hat{B}$. The dynamic range reduction process performs a truncate operation to the time domain matrix B (e.g., according to equations (4) or (5)). Corresponding to line 12 of the algorithm 400, a modulation process is performed to transform the truncated time domain matrix $\hat{B}$ resulted from the dynamic range reduction process to the frequency domain to generate the frequency domain matrix X'. Corresponding to line 13 of the algorithm 400, the adjustment values Z are updated using the difference between the frequency domain matrices X' and X. The updated adjustment values Z will be used in the next iteration.

Figure 5:
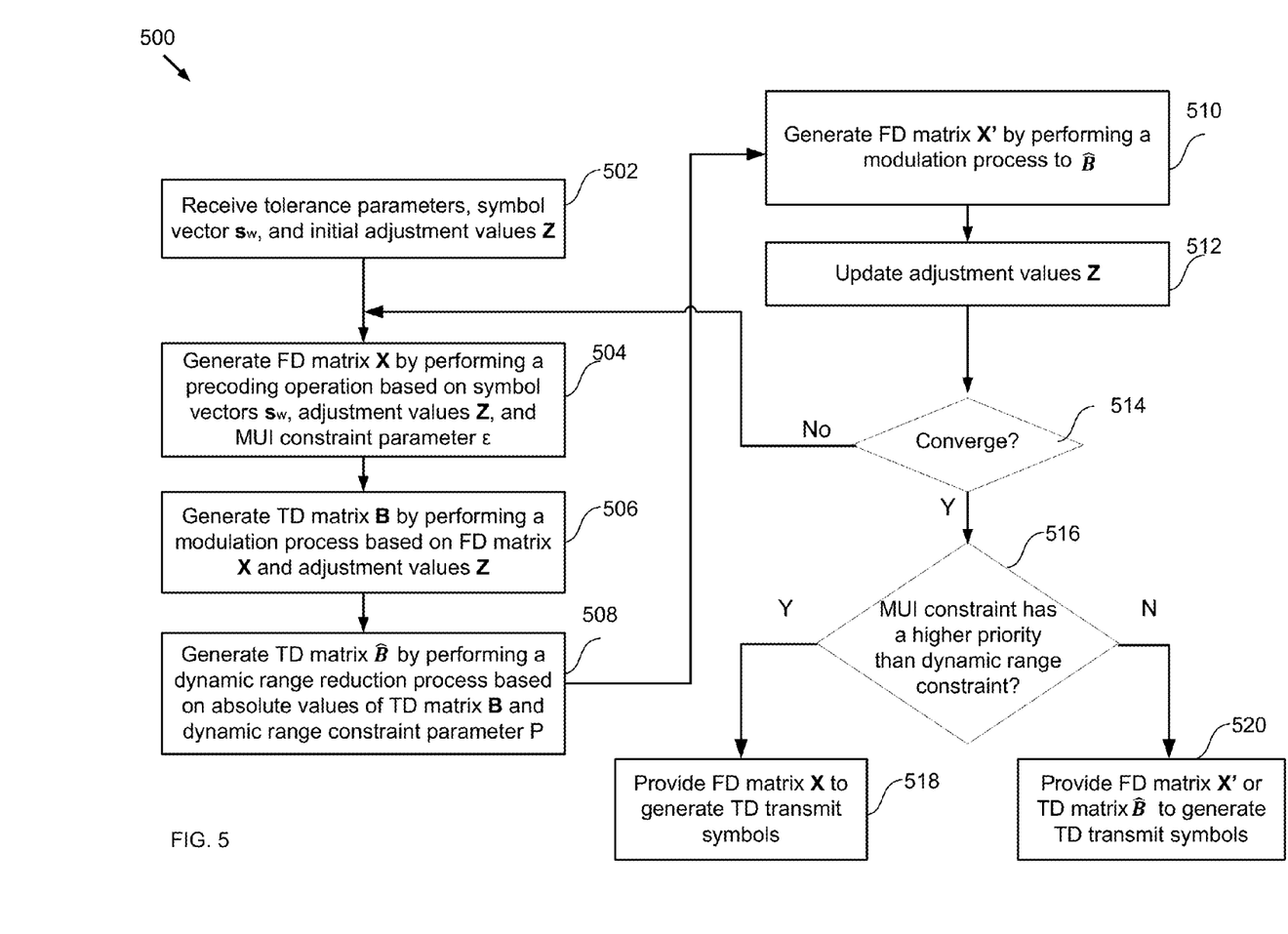
FIG. 5 is a block diagram illustrating an exemplary method to perform a downlink operation according to some embodiments of the present disclosure.
Figure 6:
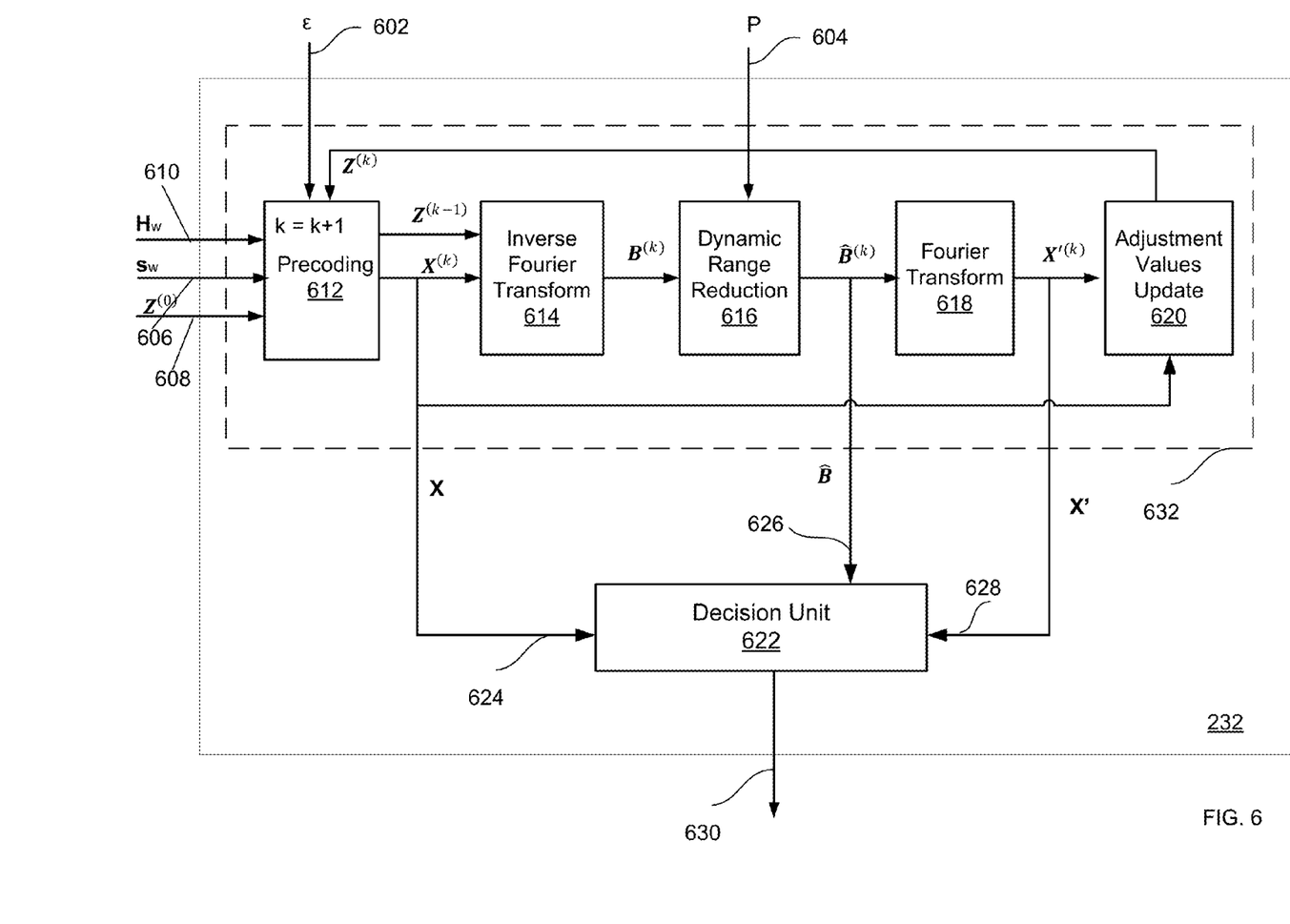
FIG. 6 is a block diagram illustrating an exemplary downlink data processing system according to some embodiments of the present disclosure.

Referring to FIGS. 5 and 6, an example of a downlink processing method 500 using the algorithm 400 of FIG. 4 is described. The method 500 begins at block 502, where tolerance parameters, symbol vectors $s_w$, and initial adjustment values $Z^{(0)}$ are received. Referring to FIG. 6, a downlink unit 232 includes one or more inputs for receiving the tolerance parameters. For example, the downlink unit 232 receives an MUI constraint parameter e at the input 602, and receives a dynamic range parameter P at the input 604. The downlink unit 232 may receive symbol vectors $s_w$ at the input 606, and initial adjustment values $Z^{(0)}$ at the input 608. The downlink unit 232 may also receive parameters for the downlink process including, for example, channel matrix $H_w$ (e.g., from an input 610) and the total number of iterations K. The downlink unit 232 includes an iteration unit 632 including a precoding unit 612, an inverse Fourier transform unit 614, a dynamic range reduction unit 616, a Fourier transform unit 618, and an adjustment values update unit 620. The iteration unit 632 may be configured to perform the K iterations as described in detail below.

The method 500 may then proceed to block 504, where a precoding process is performed to generate a frequency domain matrix X using symbol vectors $s_w$ and the adjustment values Z. Referring to FIG. 6, a precoding unit 612 of the iteration unit 632 may compute a frequency domain matrix X based on symbol vectors $s_w$, adjustment values Z, and the MUI constraint parameter $\epsilon$. In an example, the precoding unit 612 generates the precoded vectors $x_w$, w=1, ..., W, computed according to lines 3 to 9 of the algorithm 400.

Figure 7:
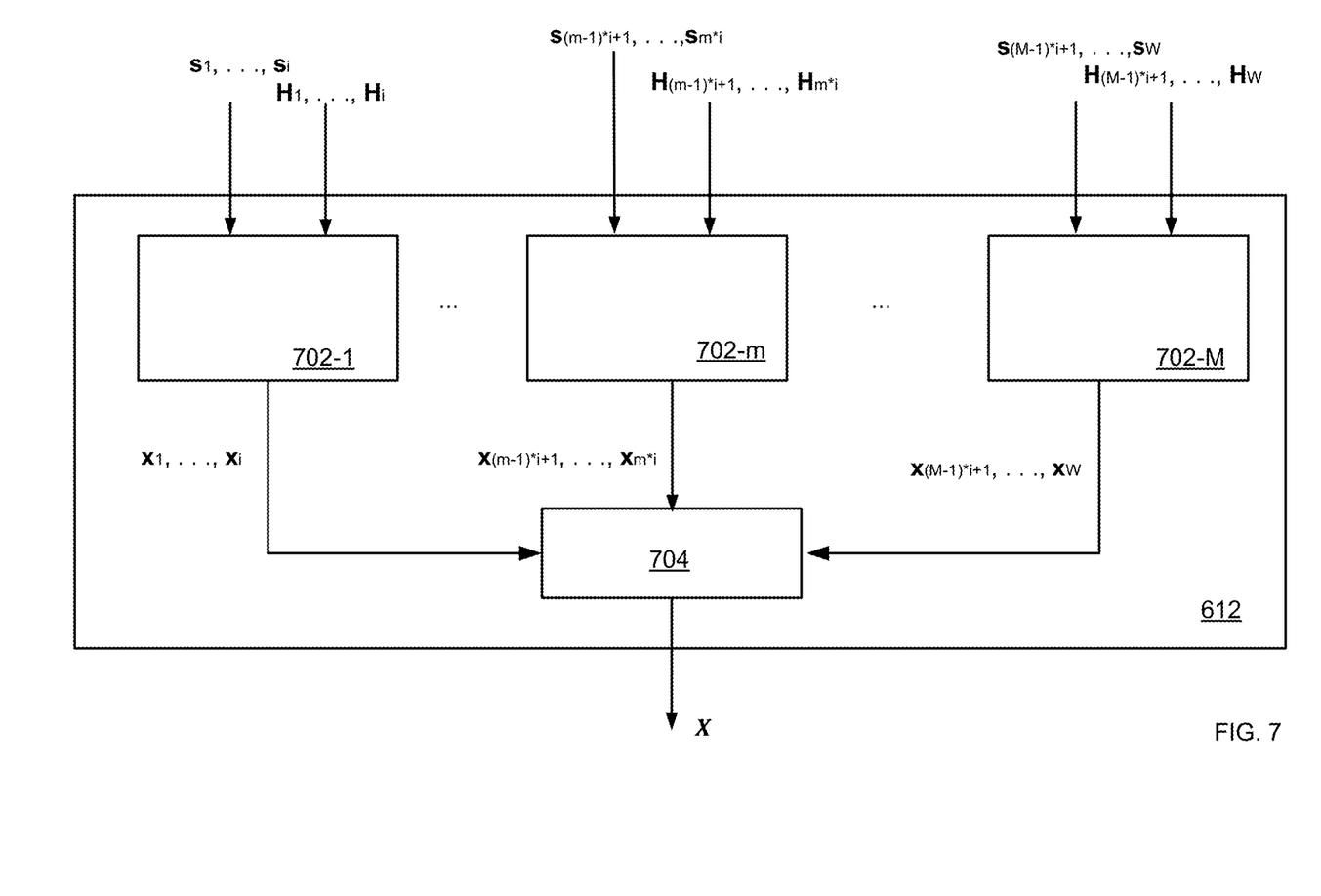
FIG. 7 is a block diagram illustrating an exemplary precoding unit according to some embodiments of the present disclosure.

In some embodiments, the precoding process may compute precoded vectors $x_w$ in parallel to improve computation performance. Referring to FIG. 7, in some embodiments, the precoding unit 612 may include a plurality of sub-precoding units performing the precoding process for groups of subcarriers in parallel. In the example of FIG. 7, W subcarriers are grouped into M groups of subcarriers, where M is a positive integer. The precoding unit 612 includes sub-precoding units 702-1 through 702-M. The $m^{th}$ sub-precoding unit 702-m may receive a plurality of symbol vectors $s_w$ and channel matrices $H_w$ corresponding to the $m^{th}$ group of subcarriers, and perform the precoding process for the $m^{th}$ group of subcarriers to generate a plurality of precoded vectors $x_w$ for that particular group of subcarriers, where m is a positive integer between 1 and M. In the example of FIG. 7, the sub-precoding unit 702-1 may receive symbol vectors $s_1$ through $s_i$ and channel matrices channel matrices $H_1$ through $H_i$ corresponding to the first group of subcarriers, which includes subcarriers 1 through i. The sub-precoding unit 702-1 may perform a precoding process (e.g., according to lines 4-5 of algorithm 400 or line 8 of algorithm 400) to generate precoded vectors $x_1$ through $x_j$ corresponding to the first group of subcarriers. Similarly, the sub-precoding unit 702-m may perform the precoding process for the $m^{th}$ group of subcarriers, which includes subcarriers (m−1)*i+1 through and generate precoded vectors $x_{(m-1)*i+1}$ through $x_{m*i}$. The sub-precoding unit 702-M may perform the precoding process for the $M^{th}$ group of subcarriers, which includes subcarriers (M−1)*i+1 through W, and generate precoded vectors $x_{(M-1)*i+1}$ through $x_W$. The precoded vectors for the M groups of subcarriers may then be sent to a combination unit 704, which generates the frequency domain precoded matrix X including $x_1$ through $x_W$.

The method 500 may then proceed to block 506, where a modulation process is performed to generate a time domain matrix B corresponding to the frequency domain matrix X. Referring to FIG. 6, an inverse Fourier transform unit 614 of the iteration unit 632 receives signals including the frequency domain matrix X and the adjustment values Z. The inverse Fourier transform unit 614 performs a modulation process (e.g., using inverse Fourier transform) based on the frequency domain matrix X and the adjustment values Z to generate a time domain matrix B. In an example, the modulation process generates the time domain matrix B according to line 10 of the algorithm 400.

The method 500 may then proceed to block 508, where a dynamic range reduction process is performed on the time domain matrix B to generate a truncated time domain matrix $\hat{B}$. Referring to FIG. 6, a dynamic range reduction unit 616 of the iteration unit 632 includes an input coupled to the inverse Fourier transform unit 614 to receive the time domain matrix B, and an input configured to receive a dynamic range parameter P. The dynamic range reduction unit 616 may perform the dynamic range reduction process to generate the truncated time domain matrix $\hat{B}$ based on the time domain matrix B and the dynamic range parameter P. In an example, the truncated time domain matrix $\hat{B}$ is computed according to line 11 of the algorithm 400.

The method 500 may then proceed to block 510, where a Fourier transformation is performed to the truncated time domain matrix $\hat{B}$ to generate a frequency domain matrix X'. Referring to FIG. 6, a Fourier transform unit 618 of the iteration unit 632 includes an input coupled to the dynamic range reduction unit 616 to receive the truncated time domain matrix $\hat{B}$. The Fourier transform unit 618 performs a Fourier transform to the truncated time domain matrix $\hat{B}$ to generate a frequency domain matrix X'. In an example, the frequency domain matrix X' is computed according to line 12 of the algorithm 400.

The method 500 may then proceed to block 512, where the adjustment values Z are updated using the difference between the frequency domain matrices X' and X. Referring to FIG. 6, an adjustment values update unit 620 of the iteration unit 632 includes an input coupled to the precoding unit 612 to receive the precoded frequency domain matrix X, and is coupled to the Fourier transform unit 618 to receive the frequency domain matrix X'. The adjustment values update unit 620 may then update the adjustment values Z with the difference between the frequency domain matrices X and X'. In an example, the updated adjustment values Z are computed according to line 13 of the algorithm 400.

The method 500 may then proceed to block 514, where it is determined whether the calculation of the method 500 converges according to a convergence criterion. In an example, the decision is based on a convergence criterion including a predetermined iteration count (e.g., the predetermined iteration count K). In that example, it is determined that the calculation converges in response to the determination that the method 500 has iterated the loop including blocks 504 through 512 at least K times. In another example, the decision is based on a convergence criterion based on whether the difference between the frequency domain matrices X and X' is less than a predetermined value.

In some embodiments, after it is determined that the calculation does not converge at block 514, the method 500 proceeds to block 504 to begin the next iteration using the updated adjustment value Z. Referring to FIG. 6, after it is determined that the calculation does not converge, the adjustment values update unit 620 provides the updated adjustment values Z to the precoding unit 612, which performs the precoding process for the next iteration using the updated adjustment values Z.

In some embodiments, after it is determined that the calculation converges at block 514, the method 500 proceeds to block 516, where it is determined whether the MUI constraint has a higher priority than the dynamic range constraint. In some embodiments, at block 516, it is determined the MUI constraint has a higher priority than the dynamic range constraint (e.g., based on wireless standards of the communication system). In such embodiments, the method 500 proceeds to block 518, where the frequency domain matrix X is provided to generate time domain transmit symbols to be transmitted on transmit antennas 208 (e.g., by performing an inverse Fourier transform to the frequency domain matrix X). In such embodiments, the MUI constraint is completely satisfied, but the dynamic range constraint may be approximately satisfied but not completely satisfied.

In some embodiments, at block 516, it is determined that the MUI constraint does not have a higher priority than the dynamic range constraint. In such embodiments, the method 500 proceeds to block 520, where the frequency domain matrix X' or the time domain matrix $\hat{B}$ are provided to generate time domain transmit symbols to be transmitted on transmit antennas 208. In such embodiments, the dynamic range constraint is completely satisfied, but the MUI constraint may be approximately satisfied but not completely satisfied. Note that an inverse Fourier transform may be performed on the frequency domain matrix X' to generate the time domain transmit symbols for transmission, while such a time domain matrix $\hat{B}$ may be transmitted using the transmit antennas 208 without performing an additional inverse Fourier transform process.

Referring to FIG. 6, the decision unit 622 is configured to receive the frequency domain matrix X at an input 624, receive the time domain matrix $\hat{B}$ at an input 626, and receive the frequency domain X' at an input 628. In an embodiment, the decision unit 622 determines whether the MUI constraint has a priority higher than the dynamic range constraint, and in response, determines the output 630 of the downlink unit 232. In an example, the decision unit 622 determines that the MUI constraint has a priority higher than the dynamic range constraint, and in response, provides the frequency domain matrix X at the output 630. In another example, the decision unit 622 determines that the MUI constraint has a priority lower than the dynamic range constraint, and in response, provides the frequency domain matrix X' or the time domain matrix $\hat{B}$ at the output 630

In various embodiments, the downlink unit 232 with its blocks may be implemented in hardware, software, or a combination of hardware and software. For purposes of clarity and not limitation, in some embodiments, the downlink unit 232 may be implemented using various hardware resources, such as for example DSP slices, BRAM, and programmable resources of an FPGA; however, in other embodiments, digital signal processors, microprocessors, multi-core processors, memory, and/or other hardware may be used.

Figure 8:
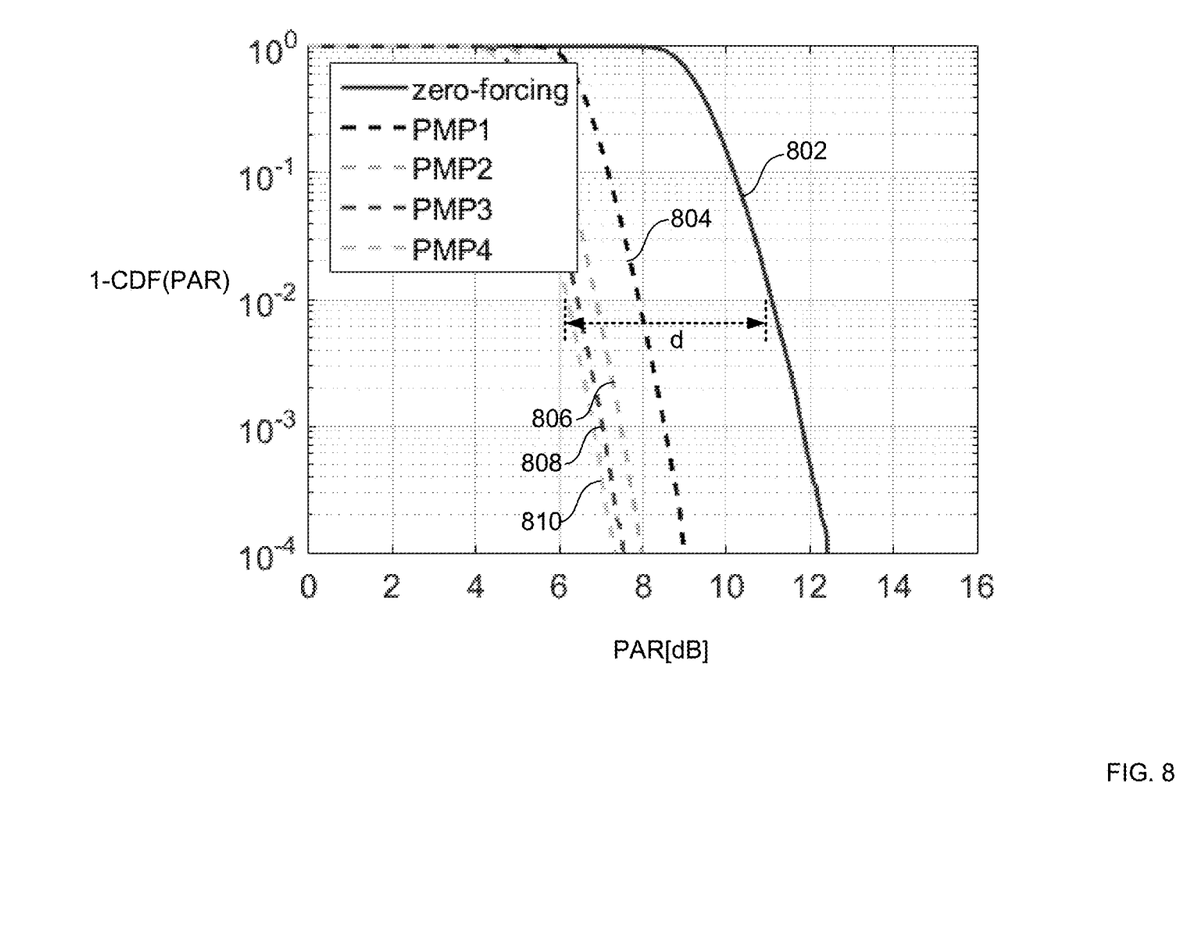
FIG. 8 illustrates performance comparison between various embodiments according to the present disclosure.

Referring now to the examples of FIG. 8, illustrated therein are example simulations showing cumulative distribution function (CDF) for different peak-to-average power ratio (PAPR) values for downlink operations in a communication according to various embodiments with different configurations. In the example of FIG. 8, the communication system includes sixty-four (64) base station antennas and sixteen (16) user antennas. The communication system employs an OFDM system with 2048 subcarriers under a WINNER-Phase-2 channel model with an antenna spacing of 10 centimeters (cm). A 256 quadrature alphabet modulation (QAM) is used. As illustrated in FIG. 8, CDF curves 802, 804, 806, 808, and 810 corresponding to various embodiments for downlink operations are illustrated. The CDF curve 802 corresponds to a downlink unit using a zero-forcing method. The CDF curve 804 corresponds to a downlink unit using a downlink processing method 500 with one iteration (e.g., K=1). The CDF curve 806 corresponds to a downlink unit using a PMD method 500 with two iterations (e.g., K=1). The CDF curve 808 corresponds to a downlink unit using a downlink processing method 500 with three iterations (e.g., K=3). The CDF curve 810 corresponds to a downlink unit using a downlink processing method 500 with four iterations (e.g., K=4). In the embodiments corresponding to CDF curves 804, 806, 808, and 810, the MUI constraint parameter $\epsilon$ is set to be zero, the dynamic range constraint parameter P is set to 1/64, and the MUI constraint has a higher priority than the dynamic range constraint. As such, the output $X^{(K)}$ is used to generate the time-domain signal to be transmitted on the transmit antennas 208, and perfect MUI removal is achieved. As shown in FIG. 8, the PMD method significantly outperforms the zero-forcing precoding method. For example, as shown in CDF curves 802 and 810, a downlink processing method 500 with four iterations achieves a PAPR reduction greater than about 5 dB compared to the zero-forcing precoding method. Further, as shown by CDF curves 804, 806, 808, and 810, in some embodiments, the PMD method only need to perform three or four iterations to achieve a 5 dB PAPR reduction, which significantly improves computational performance for a large MU-MIMO system.

It is noted that various configurations (e.g., N, U, M, K, $\epsilon$, P) illustrated in FIGS. 2, 3, 4, 5, 6, 7, and 8 are exemplary only and not intended to be limiting beyond what is specifically recited in the claims that follow. It will be understood by those skilled in that art that other configurations may be used. For example, the downlink processing method is not limited to an OFDM system. For further example, the downlink processing method may be applied to a single carrier system by setting the total number of subcarriers W to one. In some examples, the tolerance parameters, including the MUI constraint parameter $\epsilon$ and the dynamic range constraint parameter P, may be configured based on various conditions of the communication system including, for example, the total number of transmit antennas N, the total number of receive antennas U, and the channel conditions of the channel. In some examples, the number of iterations K may be configured based computational complexity and PAPR reduction capabilities requirements.

Various advantages may be present in various applications of the present disclosure. No particular advantage is required for all embodiments, and different embodiments may offer different advantages. One of the advantages of some embodiments is that computational complexity is reduced for the downlink process in an MU-MIMO communication system by using the DR splitting method to solve the PMD problem, where the solution includes performing a plurality of iterations, each iteration including a precoding process, a modulation process, and a dynamic range reduction process. Another advantage of some embodiments is that by performing the precoding process on a per-subcarrier basis in each iteration, extensive parallelization may be achieved. Yet another advantage of some embodiments is that the computational complexity may be tuned versus PAPR reduction capabilities (e.g., by configuring the number of iterations and the dynamic range parameter), while reducing out-of-band power, multi-user interferences, and inter-user interferences.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. An integrated circuit (IC), comprising:
    a downlink unit includes:
        an input configured to receive a first plurality of frequency domain (FD) symbols associated with data symbols for a plurality of users;
        an iteration unit configured to receive the first plurality of FD symbols and perform a plurality of iterations based on adjustment values, wherein the performing each iteration includes:
            generating a second plurality of FD symbols by performing a precoding process based on the first plurality of FD symbols and the adjustment values;
            generating a third plurality of time domain (TD) symbols by performing a first modulation process based on the second plurality of FD symbols and the adjustment values;
            generating a fourth plurality of TD symbols by performing a dynamic range reduction process to the third plurality of TD symbols based on absolute values of the third plurality of TD symbols; and
            updating the adjustment values based on the first plurality of FD symbols and the fourth plurality of TD symbols; and
        a decision unit configured to generate transmit TD symbols for transmission through a channel to the plurality of users based on one of the second plurality of FD symbols and the fourth plurality of TD symbols.

2. The IC of claim 1, wherein the updating the adjustment values includes:
    generating a fifth plurality of FD symbols by performing a second modulation process based on the fourth plurality of TD symbols; and
    updating the adjustment values based on differences between corresponding FD symbols of the second plurality of FD symbols and the fifth plurality of FD symbols.

3. The IC of claim 1, wherein the precoding process includes:
    for each non-occupied subcarrier of the channel, generating corresponding FD symbols of the second plurality of FD symbols with a value of zero; and
    for each occupied subcarrier of the channel, generating corresponding FD symbols of the second plurality of FD symbols based on FD symbols of the first plurality of FD symbols assigned to the occupied subcarrier and a multi-user interference (MUI) constraint parameter.

4. The IC of claim 1, wherein the dynamic range reduction process includes:
    determining that a first TD symbol of the third plurality of TD symbols has a first absolute value greater than a dynamic range constraint parameter; and
    generating a corresponding second TD symbol of the fourth plurality of TD symbols with a second absolute value less than the first absolute value.

5. The IC of claim 4, further comprising:
    a plurality of transmit antennas configured to transmit the transmit TD symbols simultaneously over the channel.

6. The IC of claim 5, wherein the dynamic range constraint parameter is configured based on at least one of a first number of the plurality of transmit antennas, a second number of the plurality of the users, and a channel matrix of the channel.

7. The IC of claim 4, wherein the first TD symbol of the third plurality of TD symbols and the corresponding second TD symbol of the fourth plurality of TD symbols have a same phase.

8. The IC of claim 1, wherein the decision unit is configured to:
    determining that an MUI constraint has a higher priority than a dynamic range constraint; and
    generating the transmit TD symbols by performing a second modulation process based on the second plurality of FD symbols.

9. The IC of claim 1, wherein the decision unit is configured to:
    determining that an MUI constraint has a lower priority than a dynamic range constraint; and
    generating the transmit TD symbols based on the fourth plurality of TD symbols.

10. The IC of claim 1, wherein the iteration unit includes:
    a first sub-precoding unit configured to perform the precoding process to a first group of the first plurality of FD symbols assigned to a first group of subcarriers of the channel; and
    a second sub-precoding unit configured to, in parallel with the first sub-precoding unit, perform the precoding process to a second group of the first plurality of FD symbols assigned to a second group of subcarriers of the channel.

11. A method, comprising:
    receiving a first plurality of frequency domain (FD) symbols associated with data symbols for a plurality of users;

performing a plurality of iterations based on adjustment values, wherein the performing each iteration includes:
  generating a second plurality of FD symbols by performing a precoding process based on the first plurality of FD symbols and the adjustment values;
  generating a third plurality of time domain (TD) symbols by performing a first modulation process to the second plurality of FD symbols based on the adjustment values;
  generating a fourth plurality of TD symbols by performing a dynamic range reduction process to the third plurality of TD symbols based on absolute values of the third plurality of TD symbols; and
  updating the adjustment values based on the first plurality of FD symbols and the fourth plurality of TD symbols; and
generating transmit TD symbols for transmission through a channel to the plurality of users based on one of the second plurality of FD symbols and the fourth plurality of TD symbols.

12. The method of claim 11, wherein the updating the adjustment values includes:
  generating a fifth plurality of FD symbols by performing a second modulation process based on the fourth plurality of TD symbols; and
  updating the adjustment values based on differences between corresponding FD symbols of the second plurality of FD symbols and the fifth plurality of FD symbols.

13. The method of claim 11, wherein the precoding process includes:
  for each non-occupied subcarrier of the channel, generating corresponding FD symbols of the second plurality of FD symbols with a value of zero; and
  for each occupied subcarrier of the channel, generating corresponding FD symbols of the second plurality of FD symbols based on FD symbols of the first plurality of FD symbols assigned to the occupied subcarrier and a multi-user interference (MUI) constraint parameter.

14. The method of claim 11, wherein the dynamic range reduction process includes:
  determining that a first TD symbol of the third plurality of TD symbols has a first absolute value greater than a dynamic range constraint parameter; and
  generating a corresponding second TD symbol of the fourth plurality of TD symbols with a second absolute value less than the first absolute value.

15. The method of claim 14, further comprising:
transmitting, using a plurality of transmit antennas, the transmit TD symbols simultaneously over the channel.

16. The method of claim 15, wherein the dynamic range constraint parameter is configured based on at least one of a first number of the plurality of transmit antennas, a second number of the plurality of the users, and a channel matrix of the channel.

17. The method of claim 14, wherein the first TD symbol of the third plurality of TD symbols and the corresponding second TD symbol of the fourth plurality of TD symbols have a same phase.

18. The method of claim 11, wherein the generating transmit TD symbols includes:
  determining that an MUI constraint of the transmission has a higher priority than a dynamic range constraint of the transmission; and
  generating the transmit TD symbols by performing a second modulation process based on the second plurality of FD symbols.

19. The method of claim 11, wherein the generating transmit TD symbols includes:
  determining that an MUI constraint of the transmission has a lower priority than a dynamic range constraint of the transmission; and
  generating the transmit TD symbols based on the fourth plurality of TD symbols.

20. The method of claim 11, wherein the generating the second plurality of FD symbols includes:
  performing a first sub-precoding process to a first group of the first plurality of FD symbols assigned to a first group of subcarriers of the channel; and
  performing a second sub-precoding process, in parallel with the first sub-precoding process, to a second group of the first plurality of FD symbols assigned to a second group of subcarriers of the channel.

* * * * *